United States Patent [19]

Hoh et al.

[11] 4,232,068
[45] Nov. 4, 1980

[54] SHIM

[76] Inventors: Thomas L. Hoh, 8311 Gaines Rd., Cincinnati, Ohio 45239; Robert H. Relly, 3051 Kirklevington Dr., Apt. 72, Lexington, Ky. 40502

[21] Appl. No.: 20

[22] Filed: Jan. 2, 1979

[51] Int. Cl.$^3$ ............................ B32B 3/30; B32B 3/26
[52] U.S. Cl. ........................................ 428/43; 428/83; 428/167; 428/179
[58] Field of Search ................. 428/167, 43, 182, 83, 428/179; 308/66, 244; 188/201, 196 M, 196 V; 85/50 R, 50 C, 50 AT; 254/104; 52/633, 126

[56] References Cited

U.S. PATENT DOCUMENTS

| | | | |
|---|---|---|---|
| 2,473,307 | 6/1949 | Seipt et al. | 308/244 |
| 2,772,596 | 12/1956 | Trussell | 188/196 M |
| 3,276,181 | 10/1966 | Gilbert | 52/633 |
| 4,135,335 | 1/1979 | Jensen | 254/104 |

*Primary Examiner*—Paul J. Thibodeau

[57] ABSTRACT

A shim for use as a spacing or leveling device between two adjacent elements such as structural elements or the like. The shim comprises a planar structure of U-shaped configuration, having parallel leg portions joined by a base portion. A handle portion may also be provided, the handle portion being coplanar with and located centrally of the shim base portion and extending therefrom in a direction opposite that of the leg portions. A line of weakening may be located at the juncture of the handle portion and the base portion, rendering the handle readily removable after proper location of the shim. The leg portions may also be provided with one or more parallel, transverse lines of weakening so that segments of the leg portions may be broken off to adjust the length of the legs. The major or upper and lower surfaces of the shim are longitudinally striated, forming alternate, narrow, longitudinal grooves and ridges. As a result, two or more shims may be stacked to provide a shim assembly of greater thickness, with the alternate grooves and ridges of the stacked shims nesting to prevent lateral shifting of the stacked shims with respect to each other.

9 Claims, 5 Drawing Figures

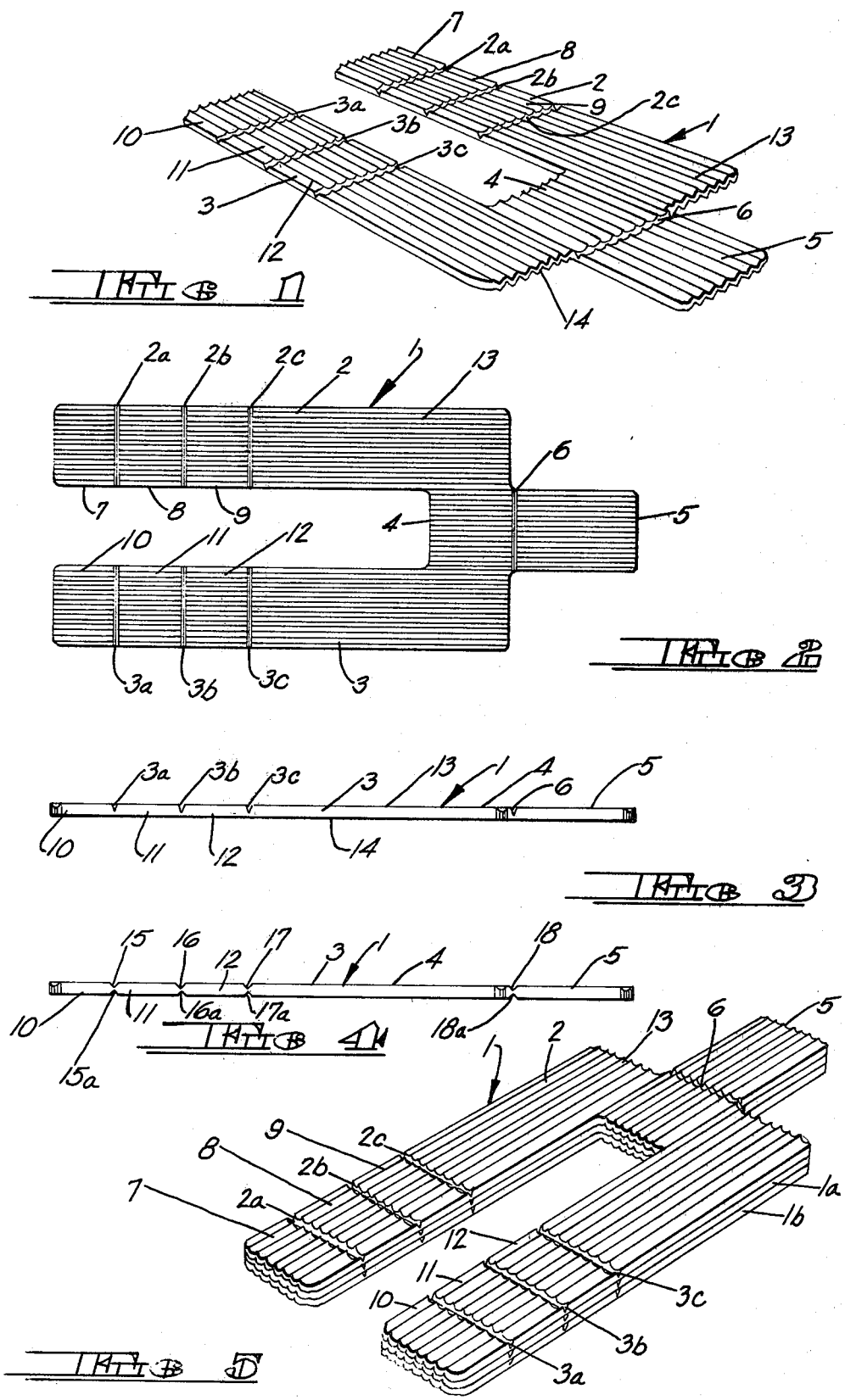

SHIM

BACKGROUND OF THE INVENTION

1. Field of the Invention

The present invention relates to an improved U-shaped shim, and more particularly to such a shim which may be stacked with other similar shims to provide a shim assembly of desired thickness and which is adjustable with respect to its length.

2. Description of the Prior Art

The shim of the present invention is substantially unlimited with respect to its use. The shim may be employed in substantially any circumstance where it is desired to level something such as machinery or the like to to provide proper spacing between two adjacent elements.

Prior art workers have devised numerous types of shims and shim assemblies. In some instances, the shims or shim assemblies are for specialized uses such as the shim assembly taught in U.S. Pat. No. 2,772,596 which comprises a pair of cooperating tapered shim elements for the control of automobile camber and caster, one of the shim elements having break-away portions. U.S. Pat. No. 3,276,181 teaches an exemplary form of shim particularly adapted for use in the building industry.

The building or construction industry is a non-limiting, but excellent example of an industry making extensive use of shims. For example, in the installation of windows or doors, the openings for such windows or doors are purposely made bigger than the window or door frames and shims are used to fill the gaps and properly align and level the frames. Shims are also commonly used in the installation of ornamental iron work, ornamental aluminum work, travertine or the like to the exterior of buildings.

In recent years the construction industry has turned to extensive use of molded shims of high impact styrene or the like. Such shims, in their most common form, are non-tapered, planar, U-shaped shims. Such shims are usually available in a regular progression of thicknesses such as 1/16th inch, ⅛th inch, ¼ inch, and the like. They are also most usually offered in two or more lengths. Still and all, it is frequently necessary to pre-cut such shims to appropriate length and the provision of shims in various thicknesses requires the maintenance of a large inventory of shims. For the convenience of the worker in the art, the various sizes of shims are often color coded.

The present invention is directed to an improved shim intended to obviate a number of the problems above. While the shim of the present invention may be made in various sizes and thicknesses, it lends itself well to being made in a single length and a single thickness. The legs of the shim of the present invention may be snap off at predetermined lines of weakening so that a number of different lengths may be obtained from one single shim shape. While the shim of the present invention may be made in various thicknesses, it lends itself well to being made in a single thickness with means provided on the shim to render it readily stackable with other similar shims to achieve the desired shim thickness, thus obviating the necessity of carrying a large inventory of different shims and having to identify them by color or shape.

The shim of the present invention may be provided with a handy snap-off handle portion for easy installation. The shim is easy to use, reduces installation time, and is balanced for both vertical or horizontal positioning. While the shim of the present invention may be made of aluminum, steel or the like, it is particularly adapted to be molded of high impact styrene or other appropriate plastic material.

SUMMARY OF THE INVENTION

The shim of the present invention is a planar, non-tapered, U-shaped structure having parallel leg portions and a base portion. The upper and lower surfaces of the shim are striated longitudinally so as to produce a plurality of narrow, parallel, longitudinal, alternate grooves and ridges. By virtue of these grooves and ridges the shim may be stacked with one or more additional similar shims. The grooves and ridges of the stacked shims tend to nest, preventing lateral shifting of the stacked shims with respect to each other.

Preferably, the shim is provided with a handle portion coplanar with the rest of the shim structure and located centrally of the base portion of the shim. The handle portion extends from the base portion in a direction opposite to that of the shim leg portions. A line of weakening may be located between the handle portion and the base portion of the shim so that once the shim has been properly located, the handle portion may be snapped off and discarded.

In somewhat similar fashion, the leg portions of the shim may be provided with snap-off segments so that their length can be readily adjusted. While not contemplated as a limitation of the present invention, the shim may be produced in one shape, size and thickness by molding from an appropriate plastic material such as high impact styrene. By appropriately adjusting the length of the leg portions and by using one or a stack of two or more shims, the desired shim size and thickness can be achieved with a single shim shape, size and thickness.

BRIEF DESCRIPTION OF THE DRAWINGS

FIG. 1 is a prespective view of the shim of the present invention.

FIG. 2 is a plan view of the shim of FIG. 1.

FIG. 3 is an edge elevational view of the shim of FIGS. 1 and 2.

FIG. 4 is an edge elevational view, similar to FIG. 3, and illustrating the provision of opposed pairs of weakening notches.

FIG. 5 is a perspective view illustrating a plurality of shims of the present invention in stacked condition.

DESCRIPTION OF THE PREFERRED EMBODIMENTS

Reference is first made to FIGS. 1 through 3 wherein the shim of the present invention is illustrated and wherein like parts have been given like index numerals. The shim itself is generally indicated at 1. As will be evident from these Figures, the shim is a substantially planar, non-tapered element of U-shaped configuration. As a result, the shim has a first leg portion 2 and second leg portion 3. These leg portions are parallel and extend in the same direction from a base portion 4.

In the particular embodiment illustrated, the shim is provided with a handle portion 5 which constitutes an integral, one-piece part of the shim. Handle portion 5 is located centrally of base portion 4, is coplanar with base portion 4 and extends therefrom in a direction opposite that of leg portions 2 and 3. The handle portion 5 is optional. In the embodiment shown, the handle portion 5 serves primarily as a means to assist in the proper location and orientation of the shim. Once the shim is in place, it may well be desirable to remove the handle portion, particularly if it protrudes from between the elements being shimmed. To this end, a notch 6 may be provided at the juncture between handle portion 5 and base portion 4, enabling the handle portion 5 to be readily snapped off and discarded.

Again, while not required, it is preferred that each of leg portions 2 and 3 be provided with a plurality of transverse notches. Such notches are shown at 2a, 2b and 2c in leg portion 2 and at 3a, 3b and 3c in leg portion 3. These notches again constitute lines of weakness. The notches 2a through 2c of leg portion 2 define break-away leg portion segments 7, 8 and 9. In similar fashion, the transverse notches 3a through 3c of leg portion 3 define break-away segments 10, 11 and 12. The number of these notches and the distance between them does not constitute a limitation on the present invention. In the embodiment shown, the break-away segments 7 through 12 are shown as being of equal size, some convenient increment of length being chosen for the spacing of notches 2a through 2c and 3a through 3c. In this way, leg portions 2 and 3 can be shortened to a predetermined desired length either before or after installation of the shim, depending upon the nature of the installation.

In the embodiment of FIGS. 1 through 3 the notch 6 and the notches 2a through 2c and 3a through 3c are shown formed in the upper surface 13 of the shim, the lower surface 14 being free of such notches. At this point it must be noted that the phrase "upper surface" and the phrase "lower surface", as used herein and in the claims, is used merely as a matter of convenience to distinguish the two major surfaces of the shim from each other and from the edges of the shim. It will be understood by one skilled in the art that the shim may be used in any orientation required by the particular installation and that the surface 13 need not always face upwardly and the surface 14 need not always face downwardly. For example, the very opposite might be true or the shim may be oriented with its long axis vertical or at some angle to the horizontal, in which instance surfaces 13 and 14 would face neither upwardly nor downwardly. The shim of the present invention is configured to be balanced for both horizontal and vertical installations.

Both the upper surface 13 and the lower surface 14 of the shim are longitudinally striated. This results in the formation on these surfaces of longitudinal, parallel, narrow, alternate grooves and ridges. The alternate grooves and ridges in surfaces 13 and 14 can most clearly be seen in FIG. 1. When the handle portion 5 is provided on the shim, the striations may continue along its upper and lower surfaces, as well, (see FIG. 1).

The striations or alternate ridges and grooves on the surfaces 13 and 14 of the shim enable the shim to be stacked with one or more identical shims. When in stacked condition, the alternate ridges and grooves on the opposed surfaces of the shims nest, minimizing any tendency of the stacked shims to shift laterally with respect to each other. In FIG. 5, the shim 1 of FIGS. 1 through 3 is illustrated as resting on top of a stack of two other identical shims 1a and 1b with the striations of the shims in nested condition.

While it is within the scope of the invention to make the shim taught herein in various thicknesses, it is preferred that the shim be made in a single thickness and that this thickness be increased, where required, by stacking two or more of the shims together, as shown in FIG. 5. Thus, the shim assembly of FIG. 5 has a thickness three times that of the single shim of FIGS. 1 through 3.

The thickness of the shim is, of course, defined by the ridges on its upper surface 13 and its lower surface 14. Preferably, this thickness will be some convenient measurement so that the number of shims to be stacked to achieve a desired shim thickness can readily be ascertained.

To illustrate the versatility of the shim of the present invention, a shim of the type illustrated in FIGS. 1 through 3 may be made up with the following exemplary dimensions. The shim may have a thickness of 1/16th inch and an overall length of 4 and ½ inches, the handle portion 5 being one inch in length. The distance between leg portions 2 and 3 may be ⅝ inch and the segments 7 through 12 may each have a length of ½ inch.

It will be evident from the above that leg portions 2 and 3 may be shortened in ½ inch increments. When two or more of the shims of the present invention are stacked, the thickness of the stacked assembly will increase by 1/16 inch for each shim added to the stack. The dimensions given above are exemplary only and other convenient dimensions may be used, as will be understood by one skilled in the art.

In the embodiment of FIGS. 1 through 3 and 6 the lines of weakening or notches 6, 2a through 2c and 3a through 3c are shown as being formed in the upper surface 13 only of the shim and as being of V-shaped cross section. It will be understood that the depth of these notches and their cross sectional configuration does not constitute a limitation of the present invention. These factors may be varied and in part will depend upon the material from which the shim is made and the ease with which the material can be broken.

FIG. 4 illustrates a modification of the shim of FIGS. 1 through 3 and 5. The shim of FIG. 4 is substantially identical and therefore like parts have been given like index numerals. The difference in the shim of FIG. 4 can most readily be ascertained from a comparison of FIGS. 3 and 4. In the shim of FIG. 4 the leg portion notches 3a, 3b and 3c of FIG. 3 have been replaced by opposed pairs of notches 15-15a, 16-16a and 17-17a. It will be understood that the leg portion 2 (not shown in FIG. 4) may be provided with similar opposed pairs of notches. In the same manner, the notch 6 of FIG. 3 has been replaced by an opposed pair of notches 18 and 18a. The pairs of notches of FIG. 4 serve the same purpose as the corresponding ones of notches 3a through 3c and 6 of FIG. 3.

The shim of the present invention may be made of any appropriate material inclusive of aluminum, steel, or the like. The material from which the shim is made is well within the choice of the skilled worker in the art and must, of course, have appropriate properties for the particular application for which it is intended. Thus, the material from which the shim is made should have appropriate strength properties, weather proof properties (if required), and the like. The shim of the present invention lends itself well to being molded of an appropriate plastic material. For example, in construction work, excellent results have been achieved with shims of the present invention molded from high impact styrene.

Modifications may be made in the invention without departing from the spirit of it. For example, the shims of the present invention could be presented to the user in the form of a face-to-face stack thereof. The shims of the stack can be lightly joined together by adhesive means or by hot stamping or tack welding at a peripheral edge thereof so that the user can readily break away one or more shims from the stack, as needed.

The embodiments of the invention in which an exclusive property or privilege is claimed are defined as follows:

1. A shim for use as a spacing device between two adjacent elements, said shim comprising a planar, U-shaped structure of uniform thickness with parallel leg portions and a connecting base portion, said shim having parallel upper and lower surfaces, said upper and lower surfaces of said shim being longitudinally striated so as to form longitudinal, parallel, narrow, alternate grooves and ridges therein, whereby two or more of said shims may be stacked to achieve a desired shim thickness with said alternate grooves and ridges of said upper and lower surfaces of adjacent shims nesting to prevent lateral shifting of said stacked shims with respect to each other, and a handle portion on said shim, said handle portion being coplanar with said shim leg and base portions, said handle portion being located centrally of said base portion and extending therefrom in a direction opposite said leg portions.

2. The structure claimed in claim 1 wherein said shim is an integral, one-piece structure molded of plastic material.

3. The structure claimed in claim 1 including transverse lines of weakening in said leg portions, said lines of weakening in each of said leg portions being parallel and in predetermined spaced relationship, whereby said leg portions may be broken off said shim along selected ones of said lines of weakening to achieve a desired length for said leg portions.

4. The structure claimed in claim 1 including a line of weakening at the juncture of said handle portion and said base portion whereby said handle portion can be broken off said shim at said line of weakening when not needed.

5. The structure claimed in claim 3 wherein said lines of weakening each comprises a notch formed in said upper surface of said shim.

6. The structure claimed in claim 3 wherein said lines of weakening each comprise an opposed pair of notches formed in said upper and lower surfaces of said shim.

7. The structure claimed in claim 4 wherein said line of weakening comprises a notch formed in said upper surface of said shim.

8. The structure claimed in claim 4 wherein said line of weakening comprises an opposed pair of notches formed in said upper and lower surfaces of said shim.

9. The structure claimed in claim 3 including a line of weakening at the juncture of said handle portion and said base portion whereby said handle portion can be broken off said shim at said line of weakening when not needed.

* * * * *